United States Patent [19]

Silva

[11] 4,168,393

[45] Sep. 18, 1979

[54] ELECTRICAL CONNECTOR COMPOSITE HOUSING AND METHOD OF MAKING SAME

[75] Inventor: Frank A. Silva, Basking Ridge, N.J.

[73] Assignee: Amerace Corporation, New York, N.Y.

[21] Appl. No.: 861,416

[22] Filed: Dec. 16, 1977

[51] Int. Cl.² .......................................... H02G 15/08
[52] U.S. Cl. .................................. 174/73 R; 264/156; 264/273; 264/295
[58] Field of Search ....................... 264/156, 273, 295; 339/DIG. 3, 59 R, 59 M, 60 R, 60 M, 61 R, 61 M; 174/73 R, 73 SC

[56] References Cited

U.S. PATENT DOCUMENTS

| | | | |
|---|---|---|---|
| 3,993,387 | 11/1976 | Venezia | 339/59 R |
| 4,054,743 | 10/1977 | Mayer et al. | 174/135 |

*Primary Examiner*—Laramie E. Askin
*Assistant Examiner*—E. F. Borchelt
*Attorney, Agent, or Firm*—S. Michael Bender; Ken Richardson; Richard A. Craig

[57] ABSTRACT

A sleeve-like insert of conductive elastomeric material of a type which serves as an internal shield in electrical connectors for connecting high voltage cables has an end portion folded upon itself, the enfolded portion being substantially permanently retained in its desired position by allowing insulative elastomeric material to fill apertures in the end portion and become bonded thereto in a void free manner, during molding of an insulating outer sleeve-like jacket about the insert.

7 Claims, 7 Drawing Figures

ELECTRICAL CONNECTOR COMPOSITE HOUSING AND METHOD OF MAKING SAME

This invention resulted from work done under Contract No. E(49-18)-1559 with the Energy Research and Development Administration.

The present invention relates generally to electrical connectors and pertains, more specifically, to a method and means for substantially permanently retaining in a desired position the enfolded portion of a sleeve-like insert utilized as internal shielding structure in a high voltage electrical connector.

It is known to provide a folded sleeve-like insert of conductive elastomeric material having folded end portions within a high voltage electrical connector as described for example, in U.S. Pat. No. 3,993,387, which is commonly assigned to the assignee of this application and which is hereby incorporated herein by this reference. Such folded conductive inserts basically function as internal conductive shields so as to avoid corona producing electrical stresses in the vicinity of the connection between terminal portions of the high voltage electrical cables with which the connectors are used.

As described in the aforesaid U.S. Pat. No. 3,993,387, folded inserts are developed by firstly molding the insert about a mandrel, such that the insert is provided with end portions extending beyond desired terminal ends of the insert. The end portions are folded back upon themselves and an outer sleeve-like housing or jacket of insulating elastomeric material is then molded about the folded insert so as to encapsulate the insert and form a composite structure therewith. Each folded end portion is affixed in its folded position with adhesives or, alternatively, by a vulcanization bond resulting from heat and pressure between the contiguous surfaces of the insert and the enfolded portion during molding of the outer jacket about the insert.

It has been found that despite the use of such adhesive or vulcanized bonds, the folded end portion of the insert is susceptible to being displaced or unfolded especially in response to movement of the connector along a mandrel during a subsequent molding operation. Therefore, a need exists to provide a method and means for assuring substantially permanent in place retention of the folded end portion of the insert. This need has been met by the present invention.

Against the foregoing background, it is a primary object of the invention to provide a sleeve-like folded insert of conductive elastomeric material, of a type for use within electrical connectors, having an enfolded portion substantially permanently retained in its intended position.

It is another object of the invention to provide a folded sleeve-like insert of conductive elastomeric material, of a type for use with an electrical connector, wherein an enfolded portion of the folded insert is substantially and permanently retained in its intended position simultaneously during molding of an outer sleeve-like housing thereabout.

It is still another object of the invention to substantially permanently retain in place an enfolded portion of a folded insert, of a type for use within electrical connectors, without the use of adhesives or mechanical fasteners.

The above objects, as well as still further objects and advantages, are achieved by the invention which may be described briefly as comprising an outer sleeve-like jacket of insulating elastomeric material for use in an electrical connector element and connecting high voltage cables, said outer sleeve-like member comprising an inner sleeve-like insert of conductive elastomeric material for serving as an internal shield disposed within said jacket, an outer surface of a first wall portion of said insert being molded integral with an inner wall portion of said jacket, at least one end of said insert having a second wall portion contiguous with said first wall portion, said second wall portion extending longitudinally beyond a desired location of a terminal end, said terminal end being located at a fold in said second wall portion being folded upon itself, at least one through aperture being disposed in at least a portion of said enfolded second wall portion, said insulating elastomeric material of said jacket extending through said at least one aperture and being bonded to said second wall portion to substantially permanently retain said second wall portion in its enfolded position.

The invention will be more fully understood, while still further objects and advantages thereof will become apparent, in the following detailed description of a preferred embodiment illustrated in the accompanying drawing, in which.

Figure 1:
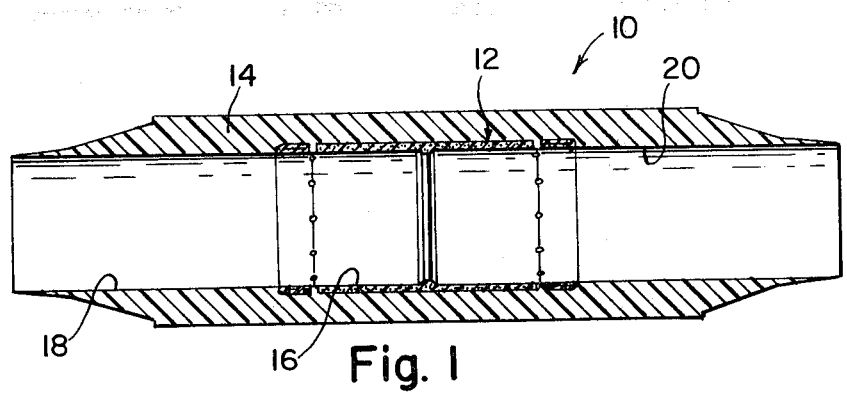
FIG. 1 is a cross-sectional view of a high voltage electrical connector constructed in accordance with the principles of the invention.

Referring initially to FIG. 1 there is illustrated a preferred form of composite housing structure 10 constructed in accordance with the invention. Composite housing 10 includes a first inner tubular or sleeve-like portion or insert 12 of conductive or semi-conductive elastomeric material and a second outer tubular or sleeve-like portion or jacket 14 of insulative elastomeric material. Suitable elastomers for fabricating both the conductive insert and insulative outer jacket are well known in the art. Inner portion or insert 12 is formed integral with outer jacket 14 preferably by molding the jacket about the insert in such a manner that the central bore 16 of insert 12 is aligned with the bore portions 18 and 20 of outer jacket 14 to form a continuous bore passing through the composite housing from end to end substantially as shown.

Composite housing 10 may also be provided with a third outer portion or jacket of semi-conductive or conductive elastomeric material as described in U.S. Pat. No. 3,993,387, but this has not been depicted for the sake of clarity and brevity of presentation.

The composite housing 10 may be used as a straight splice housing for joining a pair of high voltage electrical cables in the manner more fully described and shown in commonly assigned U.S. Pat. No. 4,054,743 which is hereby incorporated herein by this reference.

It thus will be apparent that composite housing 10 is substantially the same as the composite housing 30 shown in FIGS. 2-6 of U.S. Pat. No. 3,993,387 incorporated herein, but differs, however, in accordance with the present invention, with respect to the method and means utilized to retain the enfolded end portions of the insert portion of the housing in their desired positions as will be more fully explained anon. Composite housing also differs with respect to the device of U.S. Pat. No. 3,993,387 by being in the form of a straight splice rather than an elbow connector. It will be appreciated by those skilled in the art, however, that the present invention is equally applicable to both straight splices and elbow connectors or for that matter, any other form of electrical connector having a conductive insert and an insulative jacket or sleeve molded thereabout.

Figure 2:
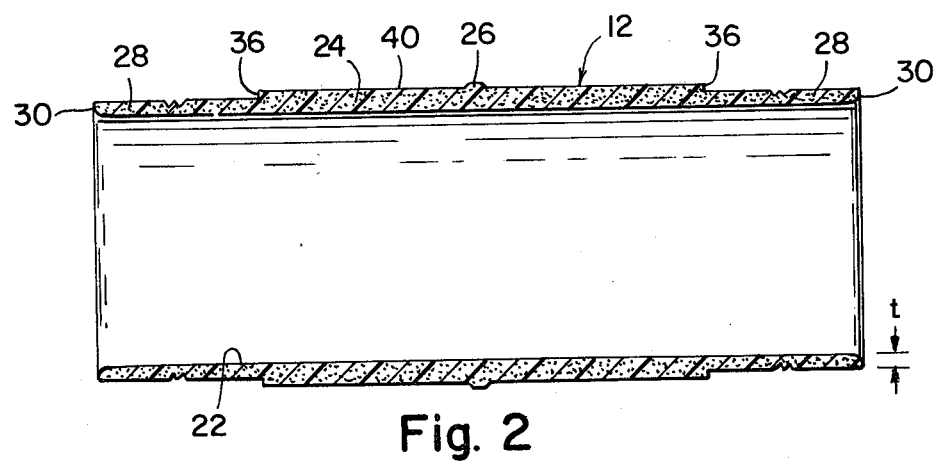
FIG. 2 is a cross-sectional view of the insert portion of the connector of FIG. 1, illustrating the insert prior to being folded inside out.

In the fabrication of composite housing 10, insert 12 is formed first as by molding about a first mandrel to form the part as substantially shown in FIG. 2.

Referring to FIG. 2, insert 12 includes a smooth through bore 22, and a central wall portion 24 having a circumferentially extending ring or ridge 26 medially disposed externally thereof. Extending longitudinally from each end of central wall portion 24 respectively, beyond the desired terminal ends of the insert, is a pair of opposed end portions 28 each one of which has reduced wall thickness "t" relative to central portion 24 and each one of which terminates at a corresponding distal edge 30. The outer surface of each end portion includes a pair of closely spaced circumferentially extending grooves 32, 34 (see FIG. 3A) located at each desired terminal end of the insert. Grooves 32, 34 permit the distal portions of each end portion 28 to be folded back toward the circumferential shoulder 36 (formed at the intersection of central portion 24 and each reduced thickness end portion 28) thus, to define a fold 38 at each desired terminal end of the insert (see FIG. 4) as will be explained more fully anon. The thickness of central wall portion 24 is approximately at least twice the wall thickness "t" of each end portion 28 contiguous therewith and extending therefrom such that surface 22 common to each end portion will substantially be flush or even with surface 40 of central wall portion 24 when each end portion 28 is eventually folded back upon itself. This arrangement is best seen in FIG. 3A where the desired position of the enfolded end portion is represented in broken line or phantom form, but see also FIG. 4.

Circumferentially extending ridge 26 which protrudes from surface 40 is adapted to engage a complementary shaped recess in an electrically conductive heat transfer assembly or crimp barrel joining say, a pair of high voltage cables (not shown), and over which the composite housing is moved during installation of the splice until the ridge 26 is seated in the complementary shaped recess. The heat transfer assembly or crimp barrel thus maintains the conductive insert 12 at the same electrical potential as that of the energized cables as is well known in the art.

Figure 3A:
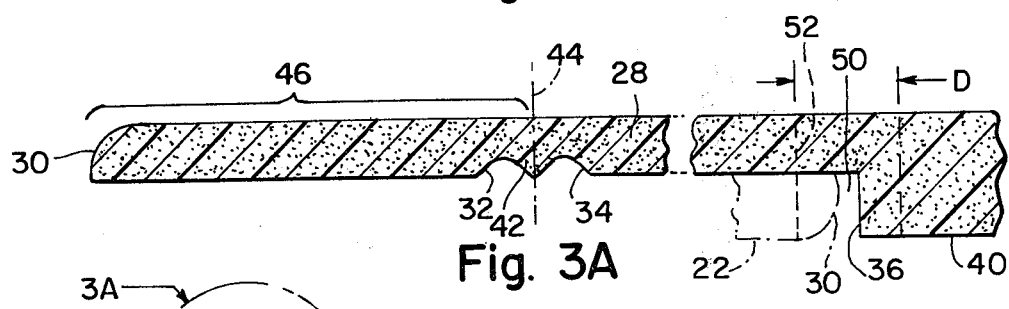
FIG. 3A is an enlarged view of a fragmentary portion of FIG. 3.

As most clearly shown in FIG. 3A, each groove 32, 34 is provided with a rounded radius, while the generally V-shaped portion 42 therebetween has a relatively dull knife edge or wedge configuration. This arrangement facilitates the folding of each end portion 28 associated with each pair of grooves 32, 34 back upon itself as described above and also provides a smooth, rounded contour at the desired terminal ends or folds 38 of the insert.

Notably, the longitudinal distance between the imaginary center line 44 corresponding to each pair of grooves 32, 34 at each opposed end of the insert 12 defines approximately the desired length of the insert as well as the approximate location of each fold 38 of insert 12 subsequent to folding. The preferred or desired length of insert 12 may vary, as it depends upon the size and electrical rating of the cable to be spliced. Generally speaking, the length and inner diameter of the insert is chosen so as to provide suitable shielding of the joined cable ends and to facilitate slidable movement of the splice composite housing over the cables and into position surrounding the joined cable ends.

Figure 3:
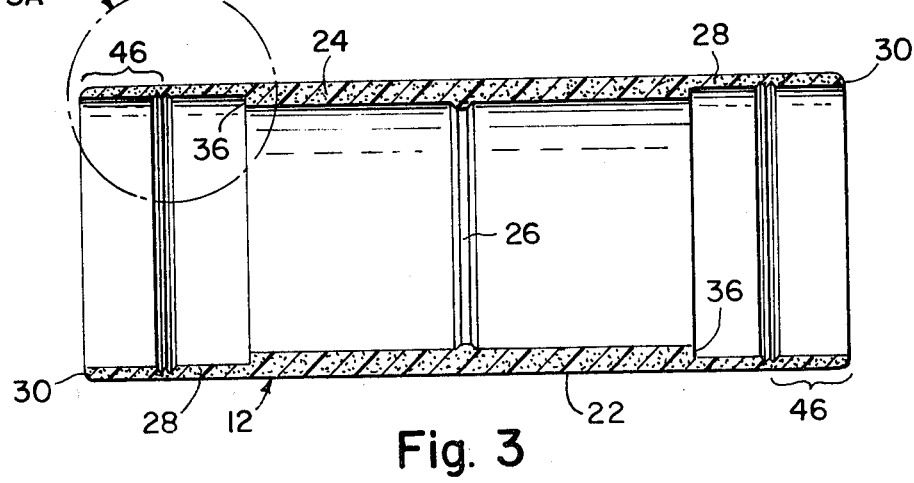
FIG. 3 is a cross-sectional view of the insert of FIG. 1 subsequent to being folded inside out.

The longitudinal or axial length of that portion of each end portion 28 which extends beyond the desired end of the insert is indicated in FIG. 3 by reference numeral 46 and extends between imaginary axis 44 and its corresponding adjacent distal edge 30. Portion 46 of end portion 28 thus defines the length of each portion of end portion 28 intended to be enfolded. Although this length may vary, each enfolded portion 46 preferably has an axial length suitable to ensure that each terminal edge 30 subsequent to folding is spaced slightly from its associated shoulder 36 as best seen in FIG. 3A as this will facilitate substantially permanently affixing enfolded portion 46 in its folded position as will be more fully explained anon.

Since surface 22 of the insert contacts the surface of the first mandrel during molding of the insert, this surface is smooth and substantially flash free. Thus, the insert of FIG. 2 is turned inside out to appear as shown in FIG. 3, so that the smooth, flash free surface 22 becomes the outer surface of the insert. This enables the juncture 48 between contiguous surfaces of the outer jacket 14 and insert 12 to be void free, including that portion of juncture 48 between the outer jacket and each terminal end or fold 38 of the insert when the outer jacket is molded about the insert as will be more fully described anon.

Figure 4:
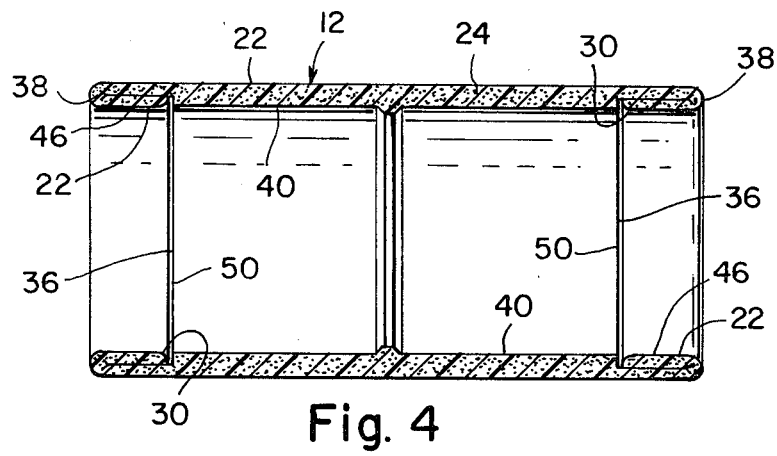
FIG. 4 is a cross-sectional view of the insert of FIG. 3 illustrating the insert subsequent to folding the end portions of the insert into their desired positions.

Upon reversing the relative positions of surfaces 22 and 40 by turning the insert of FIG. 2 inside out, each distal portion 46 of end portion 28 is folded via its corresponding pair of grooves 32, 34 back upon itself, such that, outer surface 22 common to each enfolded portion 46 is flush or even with the surface 40 of central wall portion 24 substantially as shown in FIGS. 3A and 4. As mentioned previously, and as shown in FIG. 3A, each enfolded portion 46 preferably has its distal edge 30 spaced slightly from shoulder 36. This results in the provision of a narrow circumferentially extending groove 50 spaced axially inwardly on the internal or inside bore surface of the insert with respect to each opposed fold 38 as shown in FIGS. 4, 5, and 6.

Figure 5:
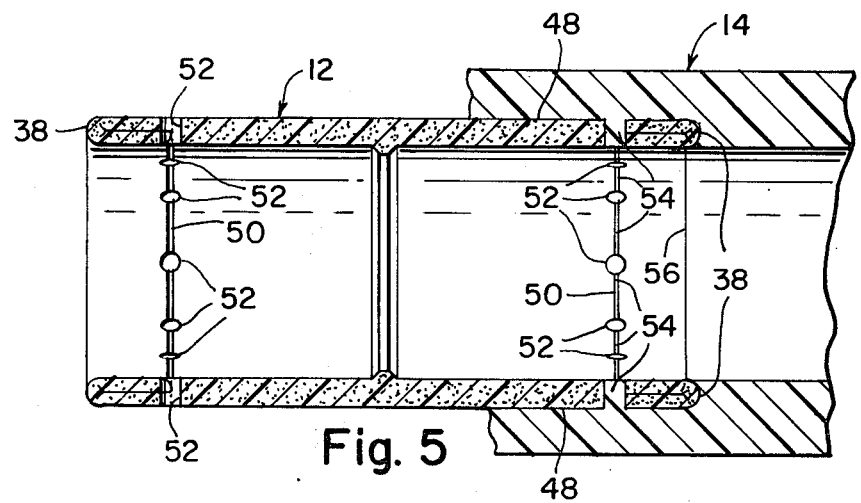
FIG. 5 is a cross-sectional view of the insert and of a fragmentary portion of an insulating jacket molded about the insert.
Figure 6:
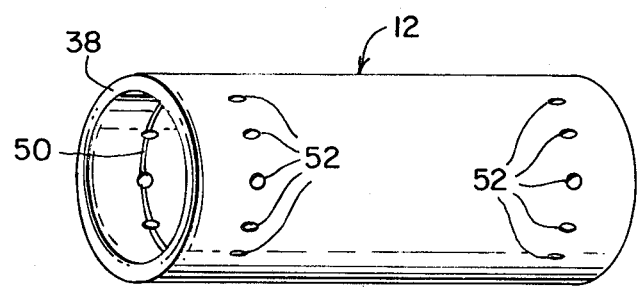
FIG. 6 is a perspective view of the insert prior to molding of the insulating jacket thereabout.

The effect of folding portion 46 as aforesaid is that any discontinuity at terminal edges 30, whether due to flash or other molding irregularities, is placed within the shielding envelope provided by the insert of FIGS. 4-6. Moreover, as noted, the insert's desired terminal ends or folds 38 present a smooth, continuous rounded surface which extend into the smooth, continuous outer surface 22 of the insert.

Before molding the outer jacket of insulative resilient material about the insert of FIGS. 4 and 6 and in accordance with the invention, a plurality of through apertures 52 are punched or drilled in the wall of the insert in a circumferentially extending array as substantially shown in FIGS. 5 and 6. Apertures 52 may be formed with a hollow drill, punch, or other equivalet hole making tool suitable for perforating the wall of insert 12 and forming the apertures therein without damaging the wall thereof. Each aperture 52 is centered on an imaginery circumference coincidental to groove 50 and has a diameter "D" sufficiently large to cause the aperture to extend beyond distal edge 30 on the one hand and beyond shoulder 36 on the other hand. Thus, as best seen in FIGS. 3A and 5, by forming each aperture 52 a portion of each distal edge portion 30 and similarly, a portion in the vicinity of each shoulder 36 are removed from the wall of the insert.

After the two circumferential arrays of apertures 52 have been formed within the wall of insert 12, the insert which appears as substantially shown in FIG. 6 is placed on a second mandrel and the outer jacket of insulating material is molded thereabout in a conventional manner. During this molding step, the heated insulating elastomeric material passes into and through apertures 52 and also into the portions of each groove 50 which extend between the apertures interiorly of the insert. Upon cooling, the insulating elastomeric material 54 within apertures 52 and grooves 50 becomes fully vulcanized to the surrounding conductive elastomeric material of the insert thus functioning to fuse or bond together in a substantially permanent manner enfolded portion 46, the remaining unfolded portion of end portion 28, and the insulating outer jacket 14.

The resulting joinder of enfolded portion 46 to insert 12 is of suitable strength so as to prevent the enfolded portions from moving or becoming free during any subsequent phase of development (such as molding a conductive outer jacket about composite housing 10) as well as during any phase of actual operation or use of a connector embodying the composite housing 10.

Upon molding outer jacket 14 about insert 12, juncture 48 between the inner surface portions of the outer jacket and the outer surface portions of the insert is rendered void free. In addition, the smooth, rounded terminal ends or folds 38, as best seen in FIG. 5, at both ends of the insert, permit the insulating elastomeric material of the outer jacket to terminate in a feather edge 56 which is spaced slightly inwardly of each corresponding fold extremity interiorly of the insert's bore in the direction toward the adjacent groove 50. In this manner, the edge 56 of the insulative outer jacket 14 is located within the envelope of the conductive shield defined by the insert and any void or other irregularity along this edge or at the axial boundaries between the outer jacket and the insert is not subjected to deleterious electrical stress.

It is to be understood that the above detailed description of the preferred embodiment of the invention is provided by way of an example only. Various details of design and construction may be modified without departing from the true spirit and scope of the invention as set forth in the appended claims.

I claim:

1. An electrical connector element for connecting high voltage cables comprising:
   (a) an outer sleeve-like jacket of insulating elastomeric material;
   (b) an inner sleeve-like member of conductive elastomeric material for serving as an internal shield disposed within said jacket, an outer surface of a first wall portion of said member being molded integral with an inner wall portion of said jacket, at least one end of said member having a second wall portion contiguous with said first wall portion of said member, said second wall portion initially extending longitudinally beyond a desired location of a terminal end, said terminal end being located at a fold in said second wall portion being folded upon itself, at least one aperture being disposed in at least a portion of said enfolded second wall portion, said insulating elastomeric material of said jacket extending into said at least one aperture and being bonded to said enfolded second wall portion to substantially permanently retain said enfolded second wall portion in its folded position.

2. The invention of claim 1, wherein said first wall portion is of a thickness greater than said second wall portion, said first wall portion defining a shoulder with respect to said second wall portion, said enfolded second wall portion including a distal edge spaced from said terminal end in a direction along said insert toward said shoulder, said distal edge being spaced from said shoulder so as to form a recess therebetween interiorly of said insert, said at least one aperture intersecting said recess so that said insulating elastomeric material in said at least one aperture extends into said recess.

3. The invention of claim 2, wherein said recess extends circumferentially interiorly of said member, and a plurality of said apertures are disposed in said member in spaced relation to one another, each of said apertures extending through the wall of said member and intersecting said recess.

4. The invention of claim 1, wherein said at least one aperture extends through both an unfolded portion of said second wall portion and an enfolded portion of said second wall portion, and said insulating elastomeric material is bonded to said both portions.

5. The invention of claim 4, wherein said at least one aperture extends through a portion of said shoulder, and said insulating elastomeric material is bonded to a portion of said shoulder through which said aperture extends.

6. A method of making a composite structure useful as an electrical connector element for connecting high voltage cables, said composite structure comprising a sleeve-like member of conductive elastomeric material serving as an internal shield within a sleeve-like outer jacket of insulating elastomeric material; said method comprising the steps of:
   (a) forming said member with at least one end defining a first wall portion extending longitudinally beyond a desired terminal end of said member;
   (b) folding said first wall portion back upon itself to form a fold which establishes said terminal end of said member;
   (c) forming at least one aperture within at least a portion of said enfolded first wall portion;
   (d) molding said jacket of insulative material about said member while simultaneously allowing said material to extend into said at least one aperture whereby said material is bonded to said at least a portion of said enfolded first wall portion to substantially permanently retain said enfolded first wall portion in its folded position.

7. The method of claim 6, wherein
   said step (b) of folding said first wall portion back upon itself to form a fold comprises spacing the terminal edge of said enfolded wall portion from a portion of said member having greater thickness than said first wall portion to form a recess extending interiorly of said member, said step (c) of forming at least one aperture comprises the step of forming additional ones of said apertures to form a plurality of apertures spaced one from the other, each of said apertures extending into at least a portion of said enfolded first wall portion and intersecting said recess, and said step (d) of molding said jacket of insulative material about said member while simultaneously allowing said material to extend into said at least one aperture comprises the step of allowing said material to extend into said plurality of apertures and into the recess intersected by said plurality of apertures.

* * * * *